United States Patent [19]

Palm

[11] 4,400,369
[45] Aug. 23, 1983

[54] APPARATUS AND PROCESS FOR RECOVERING HEAT EMANATING FROM THE SHELL OF A THERMAL REACTOR IN A SULFUR RECOVERY PLANT

[75] Inventor: John W. Palm, Tulsa, Okla.

[73] Assignee: Standard Oil Company (Indiana), Chicago, Ill.

[21] Appl. No.: 369,944

[22] Filed: Apr. 19, 1982

[51] Int. Cl.³ .................... C01B 17/02; C22B 26/10
[52] U.S. Cl. ........................ 423/574 R; 423/573 G; 423/576; 422/203; 422/204; 60/298
[58] Field of Search ................ 423/573, 574, 576; 422/203, 204; 60/298

[56] References Cited

U.S. PATENT DOCUMENTS

| | | | |
|---|---|---|---|
| 1,923,866 | 8/1933 | Hechenbleikner | 423/542 |
| 2,767,062 | 10/1956 | Duecker | 423/576 |
| 3,860,697 | 1/1975 | Palm | 423/524 R |
| 4,029,753 | 6/1977 | Beavon | 423/574 R |
| 4,088,744 | 5/1978 | Reed et al. | 423/573 G |
| 4,164,847 | 8/1979 | Johansen | 60/298 X |

FOREIGN PATENT DOCUMENTS 1250794  9/1967  Fed. Rep. of Germany ... 423/573 G

Primary Examiner—Gregory A. Heller

[57] ABSTRACT

An apparatus and process are provided for recovering and utilizing heat emanating from the shell of a thermal reactor in a sulfur recovery plant. Air is allowed to pass between the metal shell of a thermal reactor and an insulating jacket that partially encloses the shell. As the air exits through an opening at the top of the insulating jacket it is collected by a collection hood located above the thermal reactor. The collected air is then forced into the inlet of the thermal reactor where it is mixed with acid gas and thereby the heat emanating from the thermal reactor is recirculated to heat the reaction zone.

8 Claims, 3 Drawing Figures

APPARATUS AND PROCESS FOR RECOVERING HEAT EMANATING FROM THE SHELL OF A THERMAL REACTOR IN A SULFUR RECOVERY PLANT

BACKGROUND OF THE INVENTION

This invention relates to sulfur recovery systems and processes. In particular, it relates to a process and apparatus for increasing the amount of energy recovered from the effluent gas of the thermal reactor of the sulfur recovery plant.

Federal government restrictions on the emissions of sulfur oxides and other pollutants have led to the installation of sulfur recovery facilities throughout the United States. One method widely used by the industry for the elimination of elemental sulfur from a gaseous stream is the Claus process. The Claus process follows the general formula of:

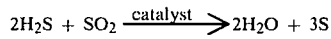

$$2H_2S + SO_2 \xrightarrow{catalyst} 2H_2O + 3S$$

In a typical Claus sulfur recovery unit, hydrogen sulfide and air are combined in a thermal reactor where a portion of the hydrogen sulfide undergoes combustion to sulfur dioxide. The sulfur dioxide thus formed then reacts according to the above equation to form elemental sulfur.

In most sulfur recovery plants, the thermal reactor is a muffle furnace. The furnace includes a metal shell which encloses the combustion zone. The shell is lined on the inside with a refractory which insulates the shell from the high temperatures of the combustion zone. Generally, a sufficient amount of refractory is used to maintain the shell at a temperature no higher than about 600° F. To conserve energy the shell of the thermal reactor is usually at least partially enclosed by an aluminum jacket. The aluminum jacket is positioned around the shell of the thermal reactor so that there is an air gap of several inches between the metal wall of the reactor and the aluminum jacket. In order to allow for air convection between the jacket and the shell, the aluminum jacket has openings at its top and bottom. This construction causes air from below the aluminum jacket to flow through the opening at the bottom, then vertically upward through the gap into the opening at the top. This air flow maintains the shell of the thermal reactor at the desired temperature.

In spite of the losses of substantial amounts of heat, air convection through the jacket is necessary in order to maintain the temperature of the shell at or below about 600° F. Without it, the temperature of the shell would rise to above 600° F. causing damage to the shell. It has, therefore, been assumed that energy loss through the shell of the thermal reactor cannot be avoided.

The view of the industry's experts on this subject is summarized by J. H. Barnhart in "*Energy Analysis of a Claus Plant: Many of the Obvious Ways of Saving Energy in a Claus Plant Are Frequently Overlooked,*" Chemical & Engineering Progress, pp. 58–59, May 1978:

One place where heat loss to the atmosphere cannot be avoided is the shell of the thermal reactor. In spite of using adequate internal refractories and insulation, the shell of this vessel must not be insulated to the point where the metal temperature is above 600° F., for to exceed this temperature causes metal deterioration by sulfiding. Many a thermal reactor has been damaged by overzealous application of insulation.

The problem which was believed to be unsolvable was commercially significant because the loss of energy associated with the shell of the thermal reactor is by no means minute. In a plant size of 17 LTD, with a furnace shell of approximately 5 feet in diameter by 24 feet long, air passes through the gap between the thermal reactor and aluminum jacket at approximately 2030 SCFM. Air which has an initial temperature of 90° F. is heated to a temperature of approximately 150° F. by radiant heat from the reactor shell. The resulting heat losses are about 140 MBTU/hour.

The present invention solves the problem which was believed to have no solution. It substantially eliminates the heat loss from the shell of the thermal reactor without raising the temperature of the shell or adversely affecting the operation of the reactor.

Accordingly, one object of the present invention is to provide a method for conserving the energy dissipated through the metal shell of the thermal reactor.

Another object of the present invention is to provide a more efficient and economical sulfur recovery unit.

A further object of the present invention is to provide a method for recovering the heat emanating from the shell of a thermal reactor to improve the efficiency of the thermal reactor.

Still another object of the present invention is to practically eliminate the heat loss to the atmosphere from the thermal reactor without damaging the thermal reactor.

A further object of the present invention is to increase the reaction temperature in the thermal reactor.

Still another object of the present invention is to increase the amount of steam produced in, and exported from, the sulfur recovery plant.

A still further object of the present invention is to provide a more cost effective process for recovering sulfur utilizing the Claus process.

Other objects of the present invention will occur to those skilled in the art upon study of this disclosure.

SUMMARY OF THE INVENTION

The present invention significantly improves the efficiency and the economy of processes for the recovery of elemental sulfur by substantially eliminating heat losses to the atmosphere from the shell of the thermal reactor.

In accordance with one aspect of the invention, air is passed by natural or induced draft between the metal shell of a thermal reactor and a jacket that partially encloses the shell. As the air passes by the metal shell it absorbs heat emanating from the shell of the reactor. Thus the air flow functions to remove heat and to maintain the shell of the reactor at a desired temperature. As the air exits through an opening at the top of the jacket it is collected by a collection hood located above the thermal reactor. The air is then forced into the inlet of the thermal reactor where it is mixed with acid gas.

DETAILED DESCRIPTION OF THE INVENTION

Figure 1:
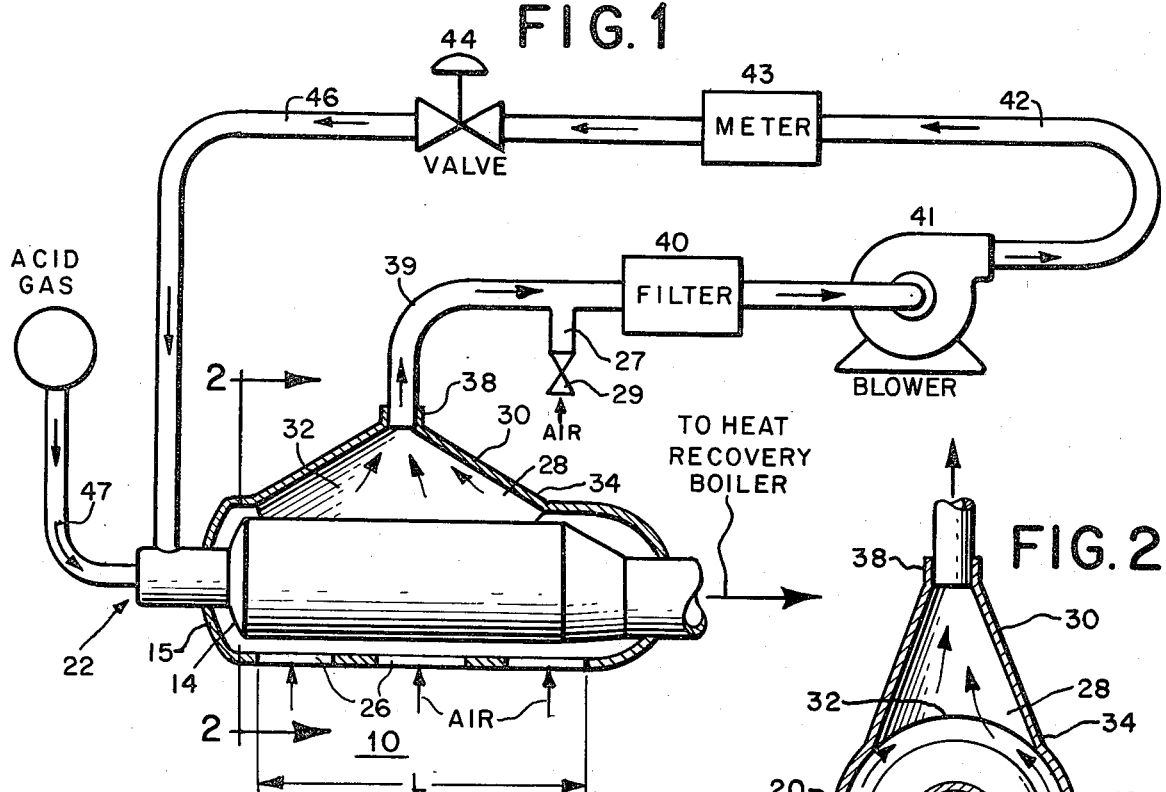
FIG. 1 is a schematic view of the heat recovery system constructed in accordance with one embodiment of the present invention.

The present invention solves the problem which was heretofore believed to be unsolvable. It provides a method and an apparatus for recovering heat given off by the shell of the thermal reactor without adversely affecting the structure of the shell or the operation of the reactor.

In accordance with the present invention, air which has passed between the shell of the thermal reactor and the jacket is collected in a hood and forced into the thermal reactor where its heat content is utilized to increase the temperature in the combustion zone.

The present invention will be described in more detail in connection with a preferred embodiment depicted in the drawings.

Figure 3:
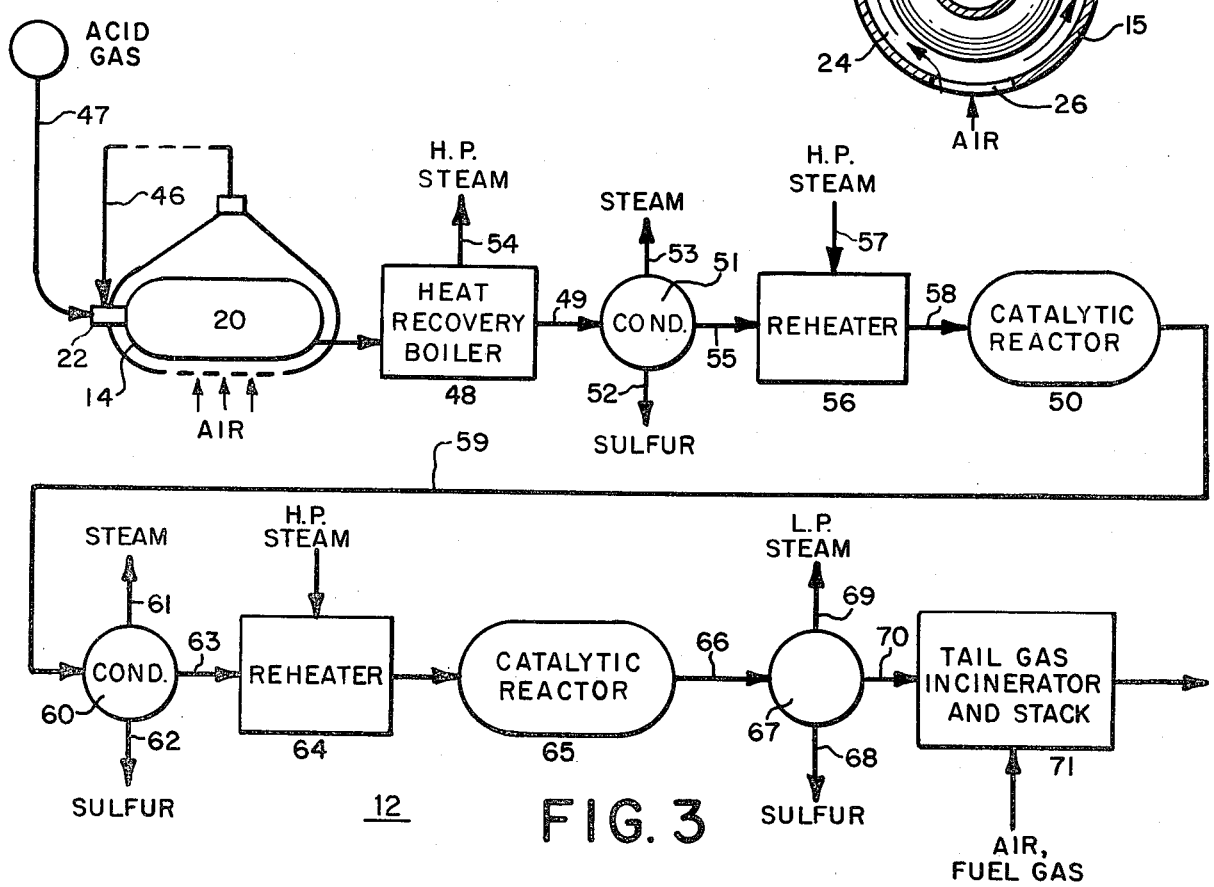
FIG. 3 is a schematic view of a sulfur recovery process embodying the heat recovery system of the present invention.

Referring now to FIG. 1, the numeral 10 designates generally a heat recovery system constructed in accordance with the present invention installed on a sulfur recovery unit 12, FIG. 3. The heat recovery system 10 includes a thermal reactor 14 and an insulating jacket 15 which limits the heat loss from the thermal reactor 14 to atmosphere.

Figure 2:
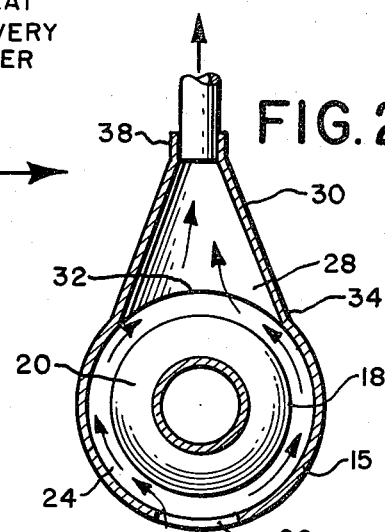
FIG. 2 is a cross-sectional view of the thermal reactor of the system of FIG. 1 taken along line 2—2 thereof showing the flow of air.

In the usual sulfur recovery system, the thermal reactor 14 is a muffle furnace. The thermal reactor 14 includes a metal shell 18 which encloses the combustion zone 20 as shown in FIG. 2. The metal shell 18 is lined on its inside with a refractory which insulates the metal shell 18 from the high temperatures of the combustion zone 20. The thermal reactor 14 also includes an inlet 22 which allows the introduction of fluids into the combustion zone 20.

In a typical sulfur recovery system 12, acid gas and air streams are introduced into the thermal reactor 14 to undergo combustion. The adiabatic temperature resulting from this combustion in zone 20 is approximately 2300° F. Generally, the metal shell 18 may be lined with a sufficient amount of internal refractories so that the shell is maintained at about 600° F.

To conserve energy the metal shell 18 is partially enclosed by an insulating jacket 15. The insulating jacket 15 is positioned around the metal shell 18 of the thermal reactor 14 so that there is an air gap 24 of several inches between the metal shell 18 and insulating jacket 15, as shown in FIG. 2. The insulating jacket 15 includes apertures 26 on its bottom which allow air to flow from below the reactor 14 through the air gap 24. Aperatures 26 should have a total opening area at least as large as two times the length of the bottom of the insulating jacket (L) times the cross-sectional width of the air gap 24. The air flows in an upward manner, as shown in FIG. 2, due to convection caused by the heat emanating from the metal shell 18 of the thermal reactor 14. At the top end of the insulating jacket 15 opening 28 is located which allows air which has passed through gap 24, adjacent the metal shell 18, to escape. Thus a flow of air is created from below the thermal reactor 14 through the gap 24 adjacent the metal shell 18. This flow of air functions to absorb the excess heat emanating from the metal shell 18 of the thermal reactor 14 therefore functioning to prevent damage to the metal shell 18 from sulfiding which would occur if the temperature of the shell exceeded 600° F.

As the air passes through gap 24 adjacent the metal shell 18 of the thermal reactor 14 it is heated. In order to conserve the energy which this air has absorbed in passing through air gap 24 a collection hood 30 is located above opening 28. The collection hood 30 functions to collect the heated air as it passes through gap 24 into opening 30, as shown in FIG. 2. To this end, the collection hood 30 includes an opening 32 which communicates with opening 28 so that the heated air may pass from the gap 24 into the collection hood 30.

In a most preferred embodiment of the heat recovery system 10, as shown in FIG. 1, the collection hood 30 is funnel shaped. The collection hood 30 includes side members 34 which are secured to a top of the insulating jacket 15. As shown in FIG. 1, opening 32 is therefore coextensive with opening 28 in the insulating jacket 15.

While the collection hood 30 is depicted in FIGS. 1–3, as being secured to the insulating jacket 15 it should be noted that it may be suspended above the insulating jacket 15 or may be coextensive with the insulating jacket 15.

When the collection hood 30 is secured to the top of the insulating jacket 15 it is generally preferable to provide a supplemental opening 27, as shown in FIG. 1. There may be periods during which the total air required for combustion of hydrogen sulfide in the plant feed gas is greater than the air required to remove the heat emanating from the thermal reactor shell 18. It should be noted that the passage of too much air through gap 24 could result in the excess cooling of the metal shell 18, particularly in cold weather. Generally it is preferred to maintain the metal shell 18 at a temperature no lower than about 250° F. because lower temperatures could cause condensation of water and acid components on the interior surface of the thermal reactor resulting in severe corrosion.

Supplemental opening 27 includes a valve 29 which can be closed or opened to result in more or less air flow through gap 24. While valve 29 and supplemental opening 27 are shown to be in line 37 they may be located at other locations such as in the collection hood 30.

Once the preheated air which has passed through gap 24 has been collected by the collection hood 30, it is then forced into the thermal reactor 14 where it is mixed with acid gas thereby increasing the energy content of the reaction gases in the combustion zone 20. To this end a preferred embodiment of the heat recovery unit 10 will be described.

Referring now to FIG. 1 and the heat recovery unit 10, connected to a top end 38 of the collection hood 30 is line 39. Line 39 connects the collection hood 30 to an inlet filter 40 of a blower 41. The blower 41 is situated so that fluids are drawn away from collection hood 30 into line 39 through the inlet filter 40 and the blower 41, as shown in FIG. 1. A partial vacuum may thus be created in line 39 and in the collection hood 30. Thus, the preheated air not only flows through opening 28 into the collection hood 30 due to the natural draft created in gap 24 but may be further induced through gap 24 and into the collection hood 30 due to the partial vacuum effect created by blower 41. This vacuum effect may be reduced by opening valve 29.

Blower 41 is connected to line 42. After the preheated air has been drawn into the blower 41 it is then directed through line 42. The preheated air passes through line 42 through a meter 43 which allows one to meter the flow rate of the heated air. A valve 44 is provided in conjunction with the meter 43, allowing an operator to adjust the fluid rate of the preheated air. When valve 44 is opened the preheated air will then be passed through line 46 into the inlet opening 22 of the thermal reactor 14. Thus, the heat recovery system 10 thereby recovers the excess heat absorbed by the air as it passed through gap 24 adjacent the metal shell 18 of the thermal reactor 14.

As is well known in the art, valve 44 is adjusted so that the stoichiometric proportion of $H_2S$ and $SO_2$ is maintained in the gases flowing to and through the catalytic reactors. In the Claus reaction the proper proportion is 2 moles of $H_2S$ per 1 mole of $SO_2$. An increase in the air flow rate through meter 43 and valve 44 increases the proportion of $SO_2$ to $H_2S$ in the gases.

Also connected to the inlet opening 22 of the thermal reactor 14 is line 47, which allows for the passage of a second fluid into the combustion zone 20 of the thermal reactor. In a sulfur recovery unit, this second fluid is an acid gas which is mixed with the preheated air to result in the combustion process in the thermal reactor 14.

To illustrate the energy which may be conserved by recovering the heat emanating from the metal shell 18 of a thermal reactor 14, an example is given. In a sulfur recovery plant size of 72 long tons per day, more than one billion BTU's may be recovered as additional steam production per year through the use of the heat recovery unit 10 of the present invention. This calculation is based on a thermal reactor shell of 5 feet in diameter by 24 long. The air flow through the gap 24 adjacent the metal shell 18 would be 2030 SCFM. With an adiabatic temperature of the fluid within the combustion zone 20 of 2300° F., the temperature of the metal shell 18 would be approximately 600° F. If 90° F. air was passed through the gap 24 it would absorb sufficient radiant heat to raise its temperature to 150° F. The delta enthalpy of this air has been calculated to be 140 MBTU/hr. Further calculations show that by mixing the acid gas with this preheated air before combustion a temperature loss of 20° F. is prevented in the thermal reactor 14. The result is a savings of about $5,000 per year, based upon present energy costs.

A preferred embodiment of the heat recovery unit 10, as it would be utilized in a sulfur recovery unit 12 utilizing a standard Claus process, will now be described. Referring to FIG. 3, a gas stream containing hydrogen sulfide is passed through line 47 into the inlet opening 22 of the thermal reactor 14. A stream of preheated air which has been recovered using the technique and apparatus described above, is passed through line 46 into the inlet opening 22 of the thermal reactor 14. These fluids are then mixed in the combustion zone 20 wherein the combustion reaction releases energy to heat the gases to a temperature of about 2300° F. and causes the conversion of a portion of the hydrogen sulfide present in the fluid to sulfur dioxide. Because the air was preheated before being mixed with the acid gas, a higher temperature results from the exothermic reaction in the combustion zone 20.

A heat recovery boiler 48 is connected to the thermal reactor 14. The heat recovery boiler 48 allows for the recovery of thermal energy generated by the thermal reactor 14, through the production of useful steam.

The effluent from the heat recovery boiler 48, containing vaporized elemental sulfur, flows through line 49 to a condenser 51 where elemental sulfur is condensed and removed through line 52 for storage. Steam is produced from the condenser 51 through line 53. This steam has a lower pressure than the high pressure steam produced through line 54 from the heat recovery boiler 48.

The gaseous effluent from condenser 51 flows through line 55 to reheater 56 where the gas is reheated. As shown in FIG. 3, the source of heat for the reheater 56 is high pressure steam which enters through line 57. Other methods of reheating may also be used as is well known in the art. The reheated gas flows through line 58 to a catalytic reactor 50.

The catalytic reactor 50 may be of any conventional type designed to carry out the reaction:

$$2H_2S + SO_2 \xrightarrow{\text{catalyst}} 2H_2O + 3S.$$

This reaction is favored by decreasing the temperature and by removal of the vaporized elemental sulfur. Catalytic reactor 50 in a conventional Claus process, would operate under temperature conditions for the Claus reaction selected to maintain the elemental sulfur substantially in a vapor state. This prevents excessive deposition of elemental sulfur on the catalyst. The operating temperature of the catalytic reactor 50 is about 550° F. to 650° F. (288°–343° C.).

The fluid mixture is then directed through line 59 into a second condenser 60 where heat is recovered through line 61 as steam and elemental sulfur is condensed and recovered through line 62. The removal of the sulfur allows for the maintaining of a down-stream catalytic reactor at lower temperatures.

From the condenser 60 the effluent moves through line 63 to a second reheater 64 and a second catalytic reactor 65. The second catalytic reactor 65, in accordance with the first reactor 50, is operated at temperature conditions for the Claus reaction, that maintain the elemental sulfur in substantially the vapor state. This likewise prevents excessive deposition of the elemental sulfur on the catalyst of the second catalytic reactor 65. The second catalytic reactor 65 is operated at a temperature of about 450°–500° F. (232°–260° C.).

The effluent is then passed from the second catalytic reactor 65 through line 66 to a third condenser 67 in which elemental sulfur is condensed and removed through line 68 and the heat produced through the Claus reaction is removed as low pressure steam through line 69.

If desired, a third catalytic reactor (not shown) may be added to the system. The third catalytic reactor, in accordance with the previously mentioned reactors, would be maintained so that the Claus reaction is carried out with the produced elemental sulfur substantially in a vapor state. Under usual operating conditions the third catalytic reaction would be maintained at a temperature of about 400°–420° F. (204°–216° C.). By using three catalytic reactors about 96% of the sulfur can be recovered.

The effluent from the second catalytic reactor 65, or if three are used from the third reactor, still contains an appreciable amount of sulfur compound even after undergoing this process. As shown in FIG. 3, this effluent may then be passed by line 70 to a tail gas incinerator and stack 71. The incinerator and stack 71 is of conventional design and constructed so that it oxidizes various sulfur species including hydrogen sulfide and elemental sulfur to sulfur dioxide, and discharges the effluent at a temperature sufficiently high to disperse the sulfur dioxide into the atmosphere at a low concentration which has no harmful effect.

Many changes and modifications will occur to those skilled in the art upon studying this disclosure. All such changes and modifications that fall within the spirit of this invention are intended to be included within its scope as defined by the appended claims.

I claim:

1. A method for combusting acid gas with air in a Claus plant thermal reactor wherein air is passed between a shell of the thermal reactor and a jacket to maintain the shell at a predetermined temperature by absorbing heat emanating therefrom, said method comprising:

recovering heat emanating from the shell by collecting resulting heated air and combining the collected heated air with acid gas to increase reactant temperatures in the Claus plant thermal reactor to produce an acid gas-air mixture;

passing said acid gas-air mixture through a reaction zone in said thermal reactor to produce a products stream including elemental sulfur vapor, water, and gas and sulfur dioxide;

passing said products stream through a heat recovery zone; then, passing said products stream through a catalytic reaction zone to produce vaporized sulfur in said products stream; and then, passing said products stream through a condenser zone to condense and remove elemental sulfur therefrom.

2. The method of claim 1 wherein collected heated air is combined with acid gas immediately prior to entering said Claus process thermal reactor.

3. The method of claim 1 wherein said air is allowed to pass by natural convection and maintains said shell at about 600° F.

4. The method of claim 1 wherein the collected heated air is forced into an inlet of said Claus thermal reactor by a blower.

5. The method of claim 4 further comprising the step of filtering the collected heated air and then metering said collected heated air into said inlet at a predetermined volume.

6. An apparatus for removing and recovering vaporized elemental sulfur from a fluid stream, said apparatus comprising:

a Claus process thermal reactor for receiving and reacting the fluid stream, the thermal reactor comprising cooling means for passing air adjacent said thermal reactor so that the air is heated and said thermal reactor is maintained at a desired temperature, said cooling means including an insulating jacket in spaced relation to said thermal reactor and a collection means for collecting the heated air;

means for passing the heated air from said collection means into said thermal reactor;

means for mixing the heated air with the fluid stream in said thermal reactor;

means for recovering heat produced in said thermal reactor;

a first catalytic reactor means for catalytically reacting the fluid stream in a first Claus process reaction;

means for directing the fluid stream from said thermal reactor to said first catalytic reactor means;

a first cooling system means for condensing sulfur from the catalytically reacted stream to produce a further fluid stream containing residual sulfurous components;

means for reheating said further fluid stream; and a second catalytic reactor means for reacting said further fluid stream in a second Claus process reaction.

7. The apparatus of claim 6 wherein the means for mixing further comprises:

a blower; and meter means for regulating the flow of said collected air into an inlet of the Claus process thermal reactor.

8. The apparatus of claim 6 wherein said collection means includes a supplemental opening for allowing air which has not passed through an air gap between said insulating jacket and said thermal reactor to be mixed with collected heated air before it is forced into an inlet of the Claus process thermal reactor.

* * * * *